United States Patent
Kao et al.

(10) Patent No.: US 7,138,980 B2
(45) Date of Patent: Nov. 21, 2006

(54) INPUT APPARATUS WITH SCROLLING FUNCTION ON CURSOR KEY AND METHOD THEREOF

(75) Inventors: Huang-Hsiao Kao, Taoyuan (TW); Mao-Sung Huang, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 555 days.

(21) Appl. No.: 10/752,104

(22) Filed: Jan. 5, 2004

(65) Prior Publication Data

US 2004/0135772 A1 Jul. 15, 2004

(30) Foreign Application Priority Data

Jan. 9, 2003 (TW) .............................. 92100403 A

(51) Int. Cl.
*G09G 5/08* (2006.01)
(52) U.S. Cl. ...................... 345/160; 345/156
(58) Field of Classification Search ........ 345/156–170; 400/472; 341/20–33; 715/711, 784, 785, 715/786, 830, 856–861
See application file for complete search history.

(56) References Cited

U.S. PATENT DOCUMENTS

| | | | | |
|---|---|---|---|---|
| 5,510,811 | A * | 4/1996 | Tobey et al. ................. | 345/157 |
| 5,608,895 | A * | 3/1997 | Lee .............................. | 703/24 |
| 6,396,521 | B1 * | 5/2002 | Lai et al. ..................... | 715/800 |
| 6,757,002 | B1 * | 6/2004 | Oross et al. ................. | 715/864 |
| 6,820,077 | B1 * | 11/2004 | Godfredsen et al. ........... | 707/3 |
| 7,091,954 | B1 * | 8/2006 | Iesaka ......................... | 345/168 |
| 2002/0164187 | A1* | 11/2002 | Huang ......................... | 400/472 |
| 2005/0219209 | A1* | 10/2005 | Fleck et al. ................. | 345/157 |

OTHER PUBLICATIONS 2004-785860, filed Aug. 2004, Derwant Account, Huang, M.*

* cited by examiner

*Primary Examiner*—Nitin Patel
(74) *Attorney, Agent, or Firm*—Ingrassia, Fisher & Lorenz, P.C.

(57) ABSTRACT

An input apparatus having a scrolling function includes a cursor key and a hot key. The cursor key is configured to selectively control a cursor movement on a screen and scroll data displayed on the screen. When the hot key is at a first status, in response to action of a user, the cursor key scrolls data displayed on the screen. When the hot key is at a second status, in response to action of the user, the cursor key controls the cursor movement on the screen. Methods for selectively providing a scrolling function on the input apparatus are also provided.

15 Claims, 4 Drawing Sheets

INPUT APPARATUS WITH SCROLLING FUNCTION ON CURSOR KEY AND METHOD THEREOF

CROSS REFERENCE TO RELATED APPLICATIONS

This application claims priority to Taiwan Patent Application No. 092100403 entitled "Input Apparatus Having Scrolling Function Using Cursor Key and Method Thereof", filed on Jan. 9, 2003.

FIELD OF INVENTION

The present invention generally relates to an input apparatus and, more particularly, to a keyboard having a scrolling function on a cursor key and method thereof.

BACKGROUND OF THE INVENTION

As the technology advances, people handle more and more work through computer systems. Keyboard and mouse have become the most indispensable accessories to a computer system. Recently, the computer mouse has a great improvement on scrolling operation; for example, as a roller allows users to scroll displayed data in an operating environment, such as the windows operating environment, and greatly improves the convenience and efficiency of reading or inputting information. However, when the mouse is not available, the operation of the computer system is greatly limited to the performance of a keyboard.

A conventional keyboard generally has cursor keys for controlling a cursor to move toward different directions, such as up, down, left and right, on a screen. However, when a user performs reading or viewing tasks, such as viewing a WORD file, a keyboard lacking the scrolling function will seriously reduce the working efficiency.

Therefore, there is a need to provide a keyboard with a scrolling function to enhance the keyboard performance.

SUMMARY OF THE INVENTION

One aspect of the present invention is to provide an input apparatus with a scrolling function on a cursor key.

Another aspect of the present invention is to provide an input apparatus, such as a keyboard, which determines a selective function of a cursor key according to a status of a hot key. For example, the cursor key is determined to selectively control cursor movements on a screen or scroll data displayed on the screen in response to action of a user according to the status of the hot key.

In one embodiment, an input apparatus includes a cursor key and a hot key. The cursor selectively controls a cursor movement on a screen and scrolls data displayed on the screen according to a status of the hot key. When the hot key is at a first status, in response to action of a user, the cursor key scrolls data displayed on the screen. When the hot key is at a second status, in response to action of the user, the cursor key controls the cursor movement on the screen. The input apparatus can further include a controller and an indicator. The controller detects the status of the hot key to determine whether the cursor key is configured to scroll data displayed on the screen or to control the cursor movement. The indicator is configured to indicate the status of the hot key so that the user can realize the function of the cursor key.

A further aspect of the present invention is to provide a method for selectively providing a scrolling function on an input apparatus which has a cursor key and a hot key. In one embodiment, the method includes detecting status of the hot key and determining a function of the cursor key in response to that status of the hot key. When the hot key is at a first status, the cursor key is set to scroll data displayed on a screen. When the hot key is at a second status, the cursor key is set to control a cursor movement on the screen.

In another embodiment, a method for selectively providing a scrolling function on a keyboard is provided. The keyboard has at least one cursor key and a hot key. The hot key is selectively at a first status and a second status. The method includes setting a value of a flag to be selectively a first value and a second value, which respectively correspond to the first status and the second status of the hot key. Then, whether the status of the hot key is changed is detected. When the status of the hot key is changed, the value of the flag is changed. Whether the value of the flag is the first value or the second value is determined to generate a result. According to the result, a function of the cursor key is determined. When the value of the flag is the first value, the cursor key is configured to scroll data displayed on a screen. When the value of the flag is the second value, the cursor key is configured to control a cursor movement on the screen.

Another further aspect of the present invention is to provide a method for selectively providing a scrolling function on a keyboard, which changes a corresponding key code in response to the change of the status of a hot key so as to enable a cursor key to scroll data displayed on a screen.

In another embodiment, the keyboard has a cursor key and a hot key for use with a data processing system, which has a central processing unit (CPU) and a screen. The method includes setting a value of a flag to be a first value. Then, whether status of the hot key is changed is detected. When the status of the hot key is changed, the value of the flag is changed to be a second value. Whether the value of the flag is the first value is determined to generate a result. According to the result, a corresponding key code of the cursor key is determined. When the value of the flag is the first value, the corresponding key code of the cursor key is a first key code. When the value of the flag is the second value, the corresponding key code of the cursor key is a second key code. When the cursor key is operated, the corresponding key code is transmitted to the central processing unit so that the first key code is for controlling a cursor movement on the screen, and said second key code is for scrolling data displayed on the screen.

The method further includes indicating the status of the hot key so that a user realizes the function of the cursor key. For example, the status of an indicator is changed when the status of the hot key is changed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

The present invention provides an input apparatus with a scrolling function on a cursor key and methods thereof. FIGS. 1–5 illustrate preferred embodiments of the present invention.

Figure 1:
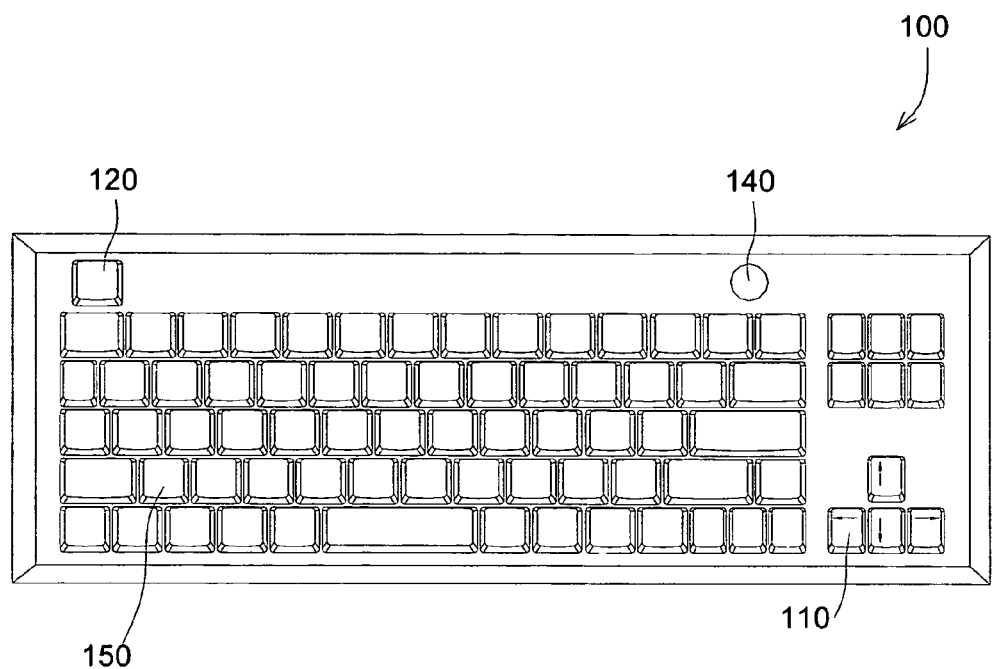
FIG. 1 illustrates an exemplary input apparatus in one embodiment of the present invention.

Referring to FIG. 1, in one embodiment, an input apparatus 100, such as a keyboard, including at least one cursor key 110 and a hot key 120, is provided. According to the status of the hot key 120, the cursor key 110 is configured to selectively control a cursor movement on a screen and scroll data displayed on the screen. The cursor key 110 scrolls data displayed on the screen in response to an action of a user, when the hot key 120 is at a first status, such as at an activated status. When the hot key 120 is at a second status, such as at an inactivated status, in response to the action of the user, the cursor key 110 controls the cursor movement on the screen. For example, the input apparatus 100 shown in FIG. 1 includes four cursor keys 110, which control the cursor movement in the four directions, up, down, left, and right, respectively. When the hot key 120 is activated, these four cursor keys 110 are configured to respectively scroll data in a corresponding direction on a screen. When the hot key 120 is inactivated, these four cursor keys 110 are configured to respectively control the cursor to move toward a corresponding direction.

In another embodiment, a method for selectively providing a scroll function on the input apparatus 100 is also provided. Referring to both FIGS. 1 and 2, the input apparatus 100 is used with a data processing system 200, such as a personal computer. The data processing system 200 includes a central processing unit (CPU) 210 and a screen 220. The input apparatus 100 further includes a controller 130 and an indicator 140. The controller 130, such as built-in integrated circuits, is configured to detect the status of the hot key 120 so as to determine the function of the cursor key 110. The indicator 140 is configured to indicate the status of the hot key 120. The indicator 140 can be a light emitting diode or any suitable device capable of enabling the user to realize the status of the hot key 120.

As shown in FIG. 1, the input apparatus 100 also includes a plurality of normal keys 150 for inputting characters, such as letters, numbers, symbols, etc. The normal keys 150, cursor keys 110, and the hot key 120 are arranged in corresponding locations of a matrix 160 shown in FIG. 2. The scan line 170 and the sense line 180 are utilized to transmit the status of each key. The method includes detecting status of the hot key 120, and determining a function of the cursor key 110 in response to the status of the hot key 120. When the hot key 120 is at a first status, the cursor key 110 is set to scroll data displayed on the screen 220. When the hot key 120 is at a second status, the cursor key 110 is set to control a cursor movement on the screen 220. In other words, when the input apparatus 100 is operated, the controller 130 is configured to set the function of the cursor keys 110 according to the status of the hot key 120.

For example, when the controller 130 detects that the hot key 120 is at the activated status, the function of the cursor key 110 is set to scroll data displayed on the screen 220. When the controller 130 detects that the hot key 120 is at the inactivated status, the function of the cursor key 110 is set to control the cursor movement. Moreover, the step of setting the function of the cursor key 110 includes changing a corresponding key code of the cursor key 110. For example, when the controller 130 detects the hot key 120 is at the activated status and a user operates the cursor key 110, the corresponding key code for scrolling data displayed on the screen 220 of the cursor key 110 is transmitted to the central processing unit 210 through the connection between the input apparatus 100 and the data processing system 200. Therefore, the cursor key 110 is utilized to scroll data displayed on the screen 220 when the hot key 120 is at the first status.

Similarly, when the controller 130 detects that the hot key 120 is at the inactivated status, the function of the cursor key 110 is set to control the cursor movement on the screen 220. When the user operates the cursor key 110, the corresponding key code for controlling the cursor movement is transmitted to the central processing unit 210 through the connection between the input apparatus 100 and the data processing system 200. Therefore, the cursor key 110 is utilized to control the cursor movement on the screen 220 when the hot key 120 is at the second status.

Figure 3:
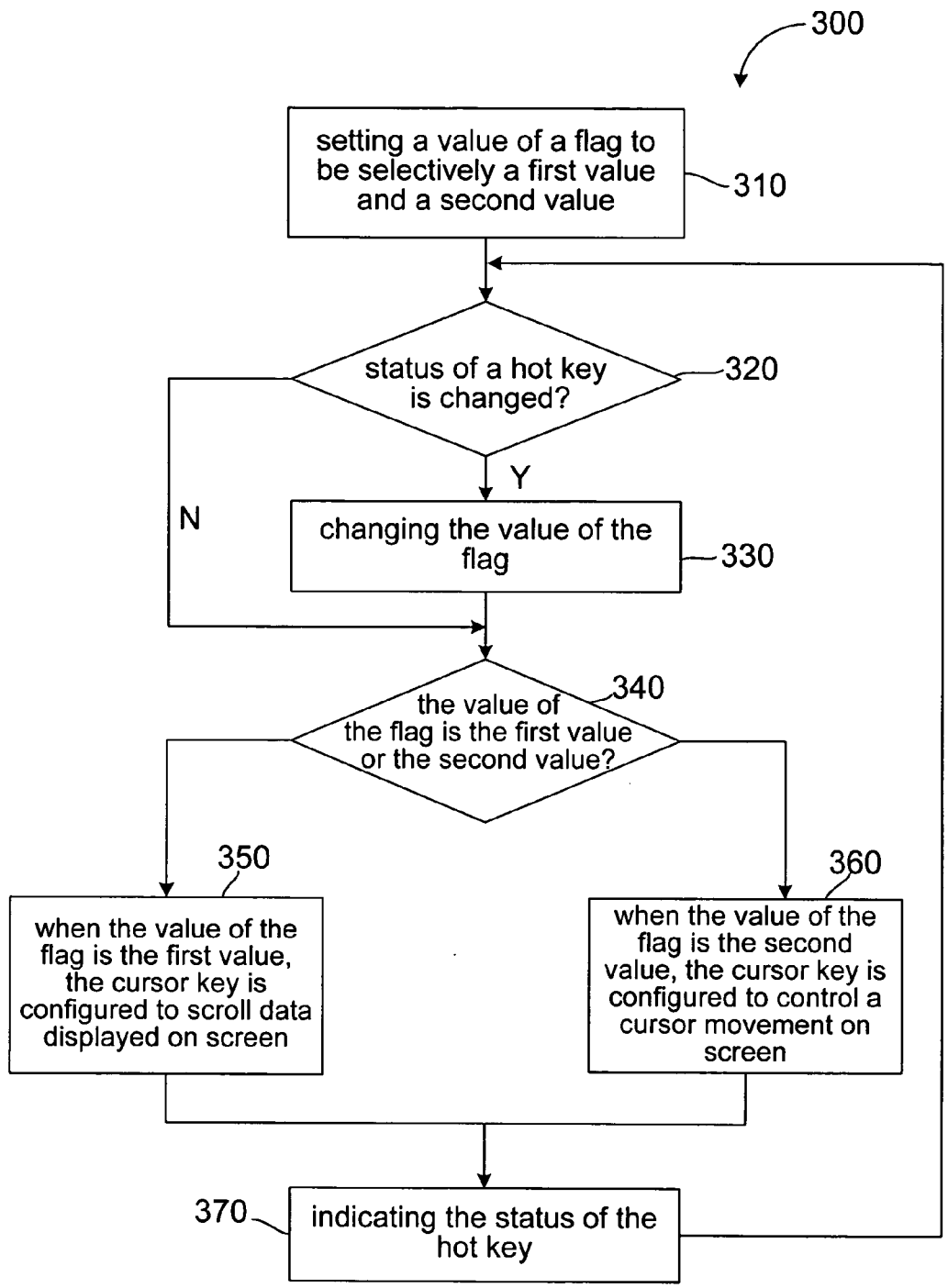
FIG. 3 illustrates a flow diagram of a method provided in a further embodiment of the present invention.

Referring to FIG. 3, in another embodiment, a flow diagram 300 of selectively providing a scrolling function on the input apparatus 100 is illustrated. The method includes setting a value of a flag in step 310. The value of the flag is selectively a first value and a second value, which respectively correspond to the first status and the second status of the hot key 120. Whether status of the hot key 120 is changed is detected in step 320. When the status of the hot key 120 is changed in step 320, the value of the flag is changed in step 330. Then, in step 340, whether the value of the flag is the first value or the second value is determined to generate a result. Next, according to the result a function of the cursor key 110 is determined. When the value of the flag is determined to be the first value, in step 350, the cursor key 110 is configured to scroll data displayed on a screen, such as screen 220. When the value of the flag is determined to be the second value, in step 360, the cursor key 110 is configured to control a cursor movement on the screen in step 360.

The method further includes indicating the status of the hot key 120 so that a user can realize the function of the cursor key 110 in step 370. For example, when the hot key 120 is at the activated status, the indicator 140, such as a light emitting diode, illuminates to indicate the activated status. When the status of the hot key 120 is changed to the inactivated status, the light emitting diode darkens to indicate the inactivated status. Therefore, the user can realize the status of the hot key 120 based on the information given by the indicator 140.

Figure 4:
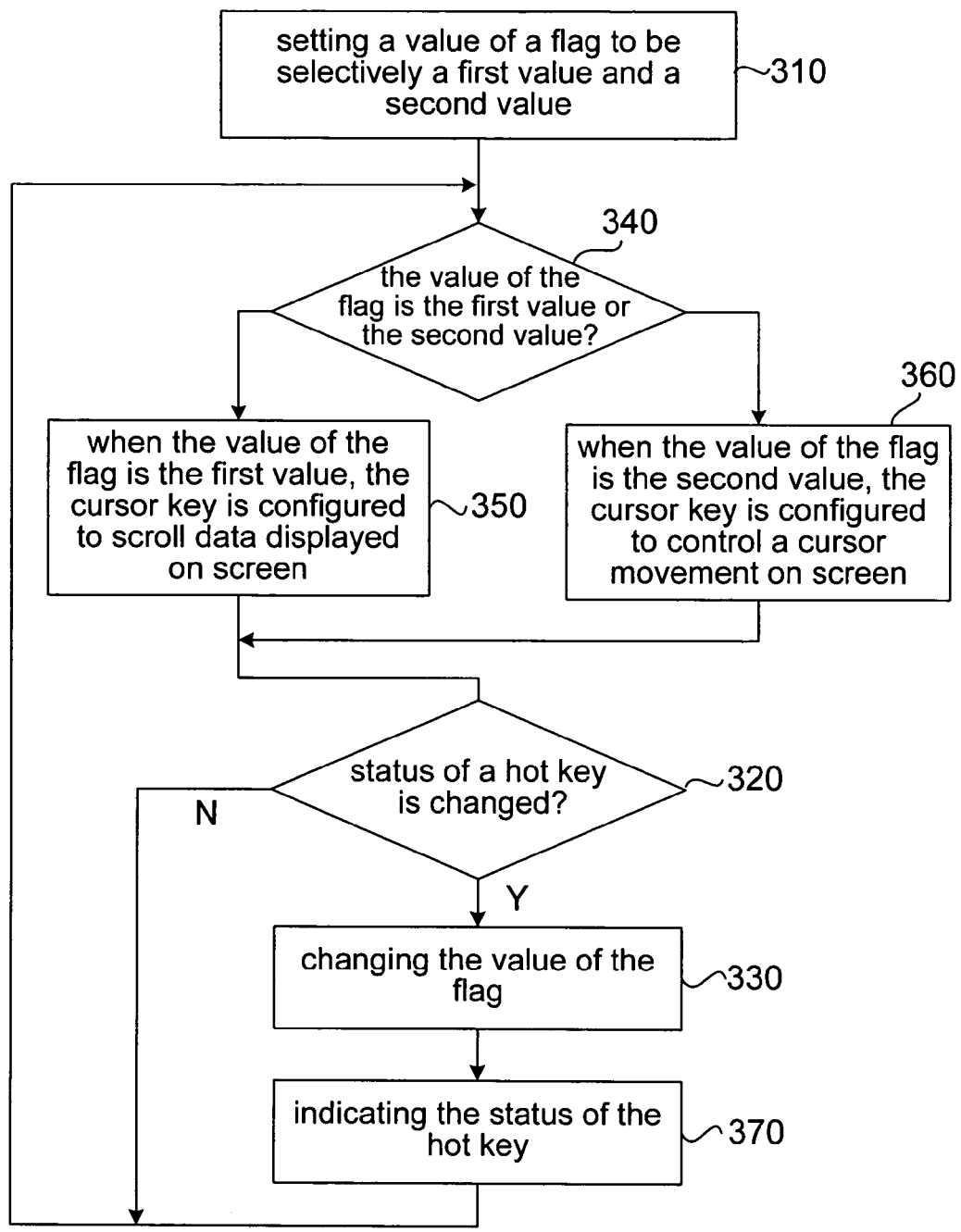
FIG. 4 illustrates a flow diagram of a modified method of FIG. 3.

Furthermore, in other embodiments, modifications can be made to the method of FIG. 3. As shown in FIG. 4, for example, the value of the flag (step 340) is determined before the determination of the status of the hoe key 120 (step 320), and followed by setting the function of the cursor key 110 (steps 350 or 360). As shown in FIG. 4, when the status of the hot key 120 is changed, the value of the flag is also changed, and the procedure goes back to the step 340 to repeat the determination of the value of the flag and to set the corresponding function of the cursor key 110. Moreover, the step of determining the value of the flag includes determining whether the value is the first value or the value is the second value.

Figure 2:
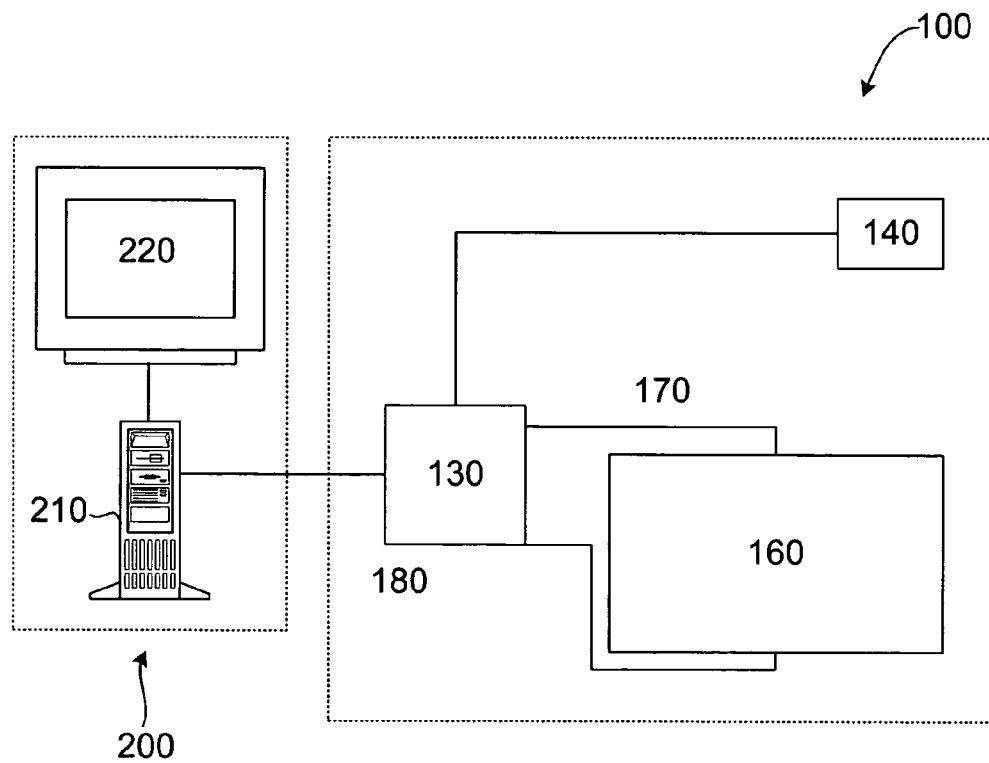
FIG. 2 illustrates a schematic block diagram of applying the input apparatus of FIG. 1 to a data processing system in another embodiment of the present invention.
Figure 5:
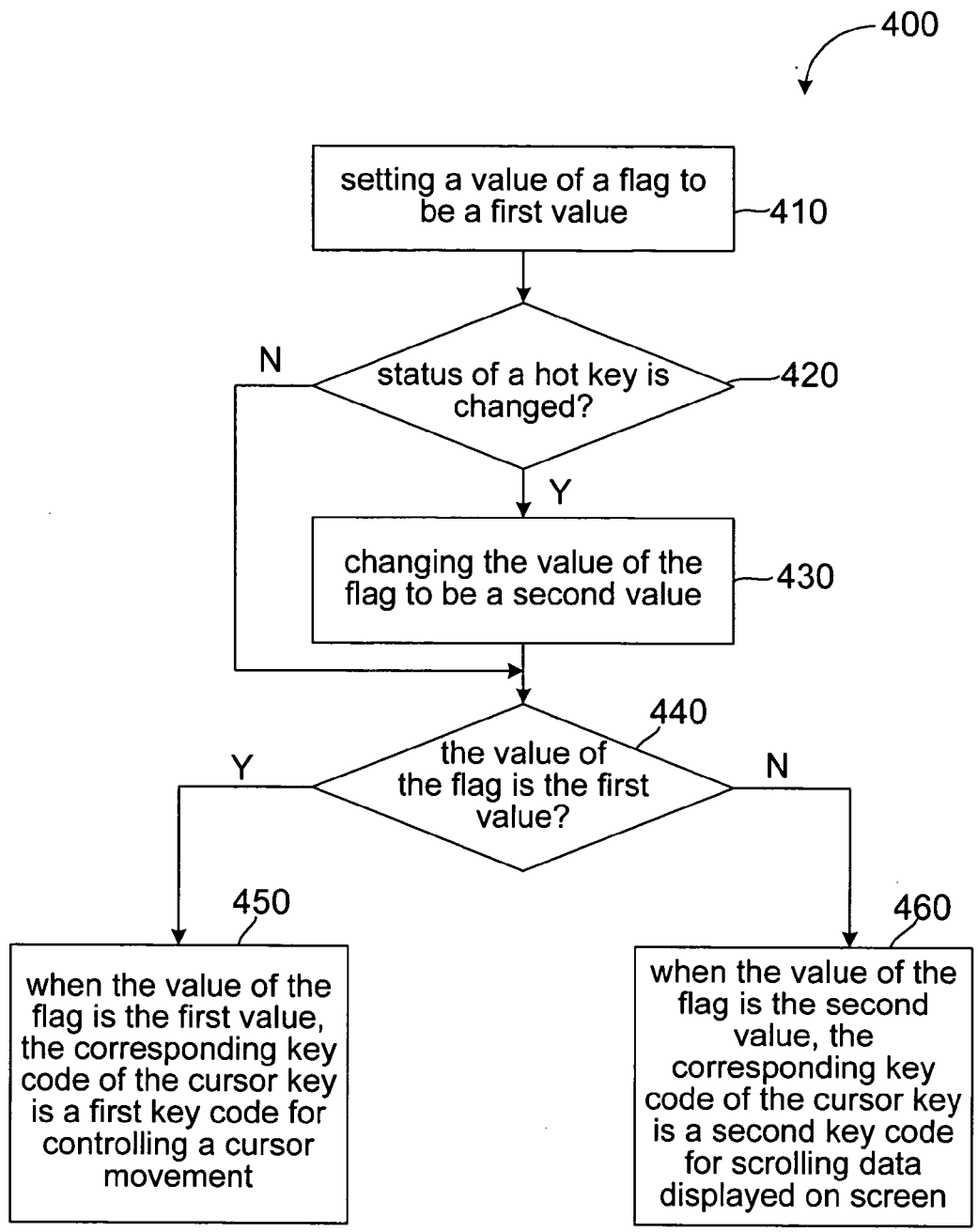
FIG. 5 illustrates a flow diagram of a method provide in another embodiment of the present invention.

Referring to both FIGS. 2 and 5, in another embodiment, a method for selectively providing a scrolling function on the input apparatus 100 is illustrated in the flow diagram

400. The method includes setting a value of a flag to be a first value in step 410. In step 420, whether status of the hot key is changed is detected. When the status of the hot key is changed in step 420, the value of the flag is changed to be a second value in step 430. Whether the value of the flag is the first value is determined to generate a result in step 440. Then, a corresponding key code of the cursor key is determined according to the result. When the value of the flag is determined to be the first value, in step 450, the corresponding key code of the cursor key is a first key code for scrolling data displayed on a screen. When the value of the flag is determined to be the second value, in step 460, the corresponding key code of the cursor key is a second key code for controlling a cursor movement on the screen. Therefore, when the cursor key is operated, the corresponding key code is transmitted to the central processing unit 210, so that the function of cursor key is performed.

It is noted that the first value of the flag corresponds to the default status of the hot key 120, such as the second status or the inactivated status. For example, when the input apparatus 100 is initialized, the function of the cursor key 100 is set to control the cursor movement. When the status of the hot key 10 is changed or the hot key is activated, the value of the flag is changed to be the second value in response to the change of status of the hot key 110. Subsequently, the function of the cursor key 110 is set to scroll data displayed on the screen.

It is noted that, in the embodiments, the function of the cursor key is set to scroll data displayed on a screen when the hot key is at the activated status. However, in an alternative embodiment, the cursor key can be set to control the cursor movement when the hot key is at the activated status, which is still within the scope of the invention.

Although specific embodiments have been illustrated and described, it will be obvious to those skilled in the art that various modifications may be made without departing from what is intended to be limited solely by the appended claims.

What is claimed is:

1. A method for selectively providing a scrolling function on a keyboard having at least one cursor key and a hot key for use with a data processing system having a central processing unit (CPU) and a screen, said hot key being selectively at a first status and a second status, comprising:
    setting a value of a flag to be a first value;
    detecting whether status of said hot key is changed;
    changing said value of said flag to be a second value when said status of said hot key is changed;
    determining whether said value of said flag is said first value to generate a result;
    determining a corresponding key code of said cursor key according to said result, wherein when said value of said flag is said first value, said corresponding key code of said cursor key is a first key code, when said value of said flag is said second value, said corresponding key code of said cursor key is a second key code; and
    transmitting said corresponding key code to said central processing unit when said cursor key is operated so that said first key code is for controlling a cursor movement on said screen, and said second key code is for scrolling data displayed on said screen.

2. The method of claim 1, further comprising indicating said status of said hot key so that a user realizes said function of said cursor key.

3. An input apparatus having a scrolling function, comprising:
    a cursor key for selectively controlling a cursor movement on a screen and scrolling data displayed on said screen; and
    a hot key;
    wherein said cursor key is configured to scroll data displayed on said screen when said hot key is at a first status, and said cursor key is configured to control said cursor movement on said screen when said hot key is at a second status.

4. The input apparatus of claim 3, wherein said first status of said hot key is an activated status, and said second status of said hot key is an inactivated status.

5. The input apparatus of claim 3, wherein said first status of said hot key is an inactivated status, and said second status of said hot key is an activated status.

6. The input apparatus of claim 3, further comprising a controller for detecting the status of said hot key to determine whether said cursor key is configured to scroll data displayed on said screen or to control said cursor movement on the screen.

7. The input apparatus of claim 3, further comprising an indicator for indicating the status of said hot key.

8. A method for selectively providing a scrolling function on an input apparatus having
    a cursor key and a hot key, comprising:
        detecting status of said hot key; and
        determining a function of said cursor key in response to said status of said hot key;
        wherein said cursor key is set to scroll data displayed on a screen when said hot key is at a first status, and said cursor key is set to control a cursor movement on said screen when said hot key is at a second status.

9. The method of claim 8, further comprising indicating said status of said hot key so that a user realizes said function of said cursor key.

10. The method of claim 8, wherein said step of setting said function of said cursor key comprises changing a corresponding key code of said cursor key so that said cursor key is utilized to scroll data displayed on said screen when said hot key is at said first status, and said cursor key is utilized to control said cursor movement on said screen when said hot key is at said second status.

11. A method for selectively providing a scrolling function on a keyboard having at least one cursor key and a hot key, said hot key being selectively at a first status and a second status, comprising:
    setting a value of a flag to be selectively a first value and a second value respectively corresponding to said first status and said second status of said hot key;
    detecting whether status of said hot key is changed;
    changing said value of said flag when said status of said hot key is changed;
    determining whether said value of said flag is said first value or said second value to generate a result; and
    determining a function of said cursor key according to said result;
    wherein said cursor key is configured to scroll data displayed on a screen when said value of said flag is said first value, and said cursor key is configured to control a cursor movement on said screen when said value of said flag is said second value.

12. The method of claim 11, further comprising indicating said status of said hot key so that a user realizes said function of said cursor key.

13. The method of claim 11, wherein said step of determining said function of said cursor key comprises changing a corresponding key code of said cursor key so that said cursor key is utilized to scroll data displayed on said screen when said value of said flag is said first value, and said cursor key is utilized to control said cursor movement on said screen when said value of said flag is said second value.

14. The method of claim 11, wherein said step of determining said value of said flag comprises determining whether said value of said flag is said first value.

15. The method of claim 11, wherein said step of determining said value of said flag comprises determining whether said value of said flag is said second value.

* * * * *